Patented Feb. 6, 1934

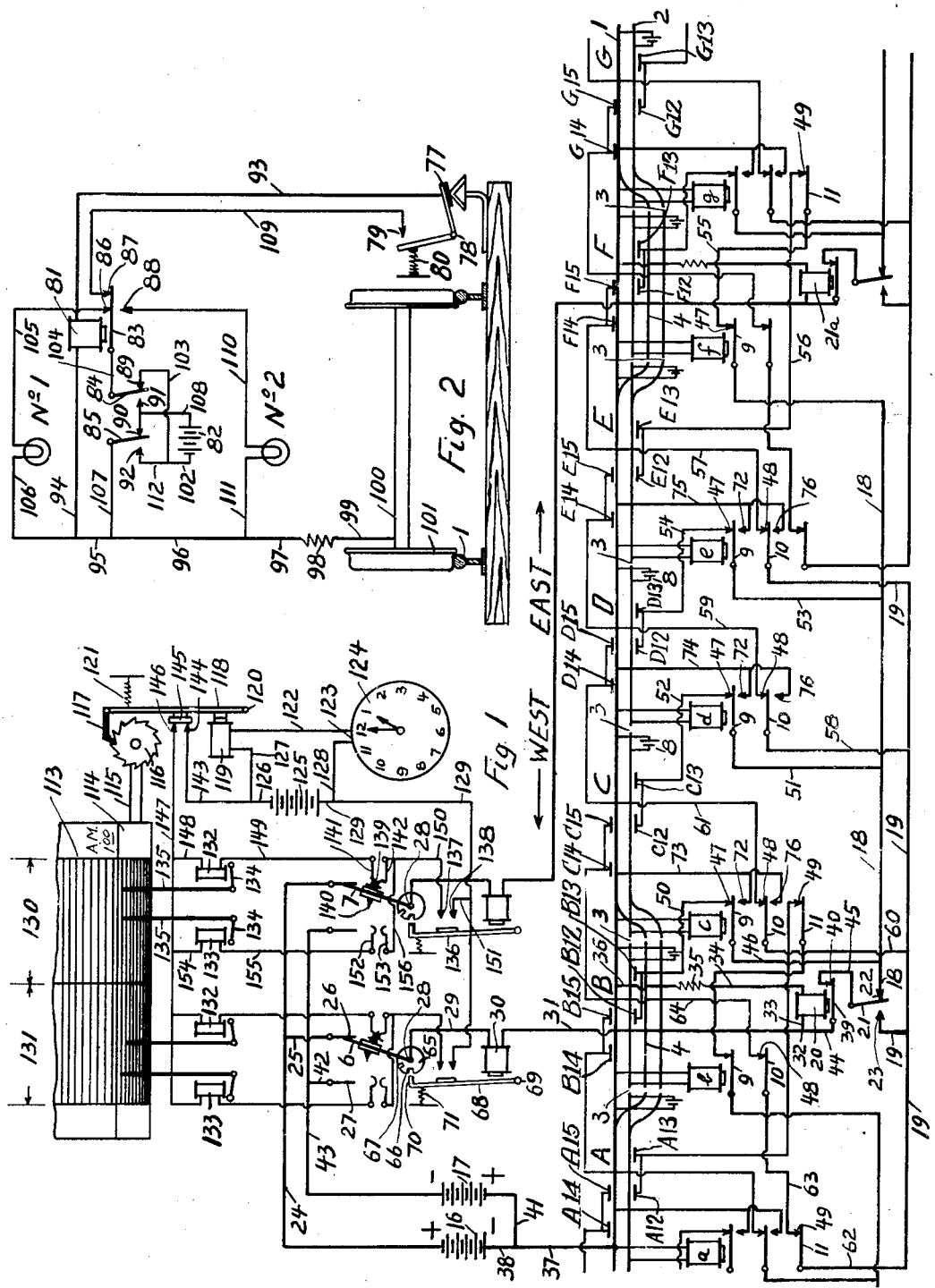

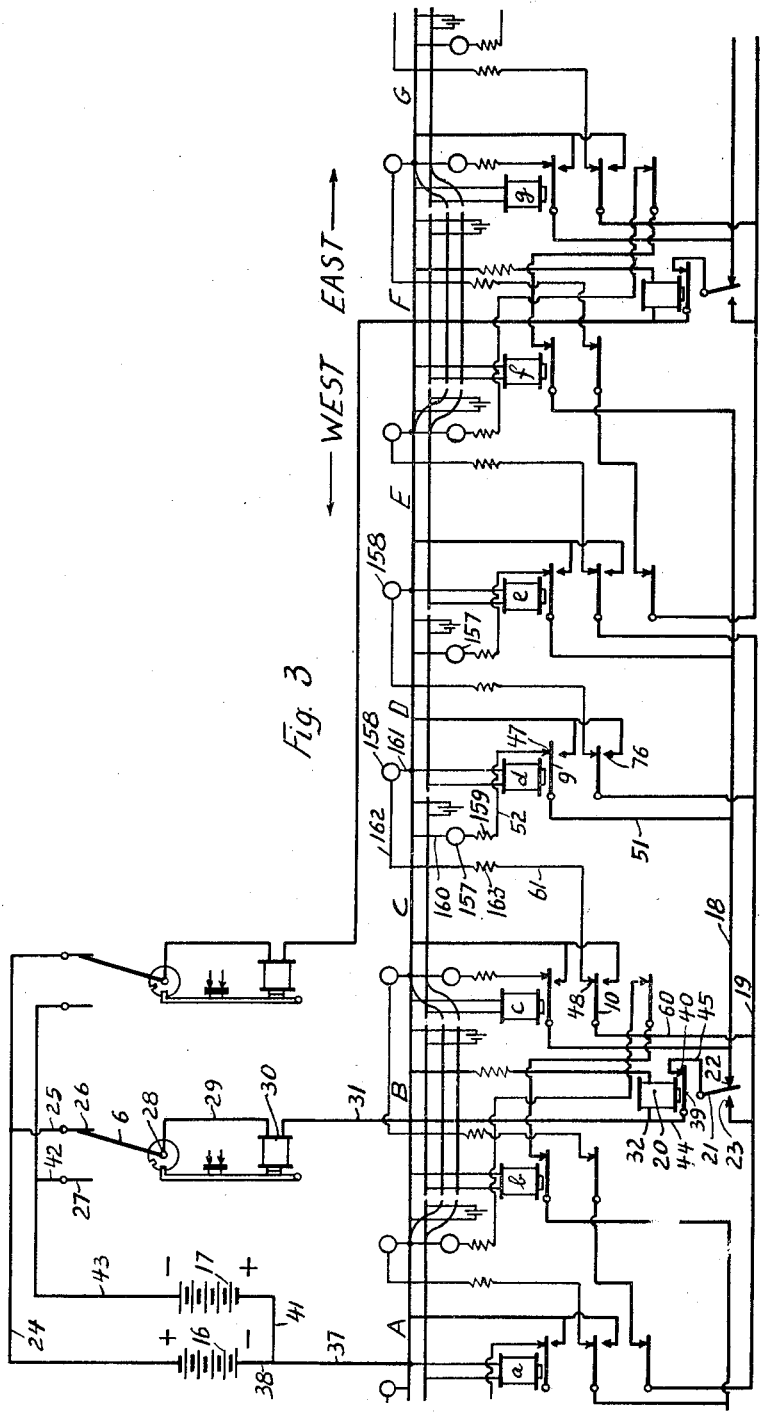

1,945,920

UNITED STATES PATENT OFFICE 1,945,920

AUTOMATIC TRAIN CONTROL

Paul J. Simmen, Eden, N. Y.

Refiled for abandoned application Serial No. 650,245, July 9, 1923. This application October 26, 1927. Serial No. 228,937

10 Claims. (Cl. 246—49)

This invention relates to automatic railway signalling and more particularly to systems in which trains are controlled both manually and automatically with regard to travel in opposite directions on a single line of track, and provision is preferably made for automatically locking the dispatcher's switch to prevent any manual change in a proceed signal when a block within the series, controlled by said switch is occupied. As illustrating such systems reference may be made to my Patents No. 1,592,469 of July 13, 1926, and No. 1,767,557, granted June 24, 1930.

The principal object of the invention is to secure in a system having the characteristics described, the advantage of selecting automatically as between differentiated currents, the current appropriate to the particular direction for which the dispatcher's switch may be set and thereby enabling the circuit connection from said switch to the unit of track which it controls, (regarding such unit broadly considered either as a block or a section comprising a series of blocks) to be limited to a single wire, regardless of the number of signals at each block for which the system may be constructed. Thereby the wiring from the dispatcher's office or its equivalent between each switch and the unit of track which it controls is greatly simplified and this simplicity is maintained however complex the system may be in respect to the number of signal indications at or within such unit.

With the above object in view the invention consists generally in means at the dispatcher's office and including a manually operated switch for selecting as between differentiated currents, e. g., positive or negative, a current intended for a particular direction of traffic, means at the trackway unit which said switch controls and which is automatically and characteristically responsive to the particular current, e. g., a polarized relay, for "routing" or directing it to the trackway devices (such as wayside signals or electrical energy transmitting means for co-operation with the vehicle) appropriate to the direction of traffic for which the particular current is intended, and a single path or wire between said switch and said means.

Further objects are to make provision, in a system having the features and advantages enumerated in the preceding paragraph, for locking the dispatcher's switch with reference to a determined series of blocks for which it has been set to give a clear signal for one direction of traffic when any of said blocks is occupied by a train moving in such direction and for making at the dispatcher's office a continuous record or indication of the movement of the trains whereby the dispatcher may at all times be informed of their positions, directions and relations of one another.

With such further objects in view the invention additionally consists generally in the control of the locking means for the dispatcher's switch by the automatic direction selectors at the trackway and the control of continuous recording or indicatory operations performed at the dispatcher's office and severally appropriate to the opposite directions of traffic by the track relays which are primarily employed for the purpose of automatic rear end protection.

In its simplest form the invention contemplates the use of positive current for conditioning the trackway devices for one direction of train movement, the use of negative current for conditioning said devices for the opposite direction of train movement, and a polarized track relay influenced by both currents and operative as a direction selector.

In its preferred form the invention contemplates the improvements above generally indicated as elements of a system having the section and siding arrangements shown in my said Patent No. 1,767,557.

In describing the invention in detail, reference is had to the accompanying drawings wherein I have illustrated a preferred physical embodiment of my invention and wherein like characters of reference designate corresponding parts throughout the several views and, in which:

Fig. 1 is a schematic representation of the apparatus and circuits in the dispatcher's office and along the track; Fig. 2 is a schematic representation of the apparatus and circuits on the locomotive or car; Fig. 3 is a modification of Fig. 1 and shows a schematic representation of part of the apparatus in the dispatcher's office and along the track by which fixed signals are displayed instead of cab signals.

Fig. 1 shows a single track consisting of rails 1 and 2. Rail 1 is electrically continuous. Rail 2 is divided into sections by means of insulating joints as 3 thus dividing the track into block sections as A, B, C, D, E, F and G. In blocks B and F are shown sidings as 4 where trains can meet and pass each other. Since the apparatus and circuits for each single track section between passing sidings are identical, only one complete single track section has been shown in Fig 1, but the dispatcher's control and the recording of train movements has been shown for two single track sections. A switch as 6 controls the signals of the section between blocks B and F and a switch as 7 controls the signals of a section east of block F. At the clearance point of the sidings insulating joints as 3 electrically separate the straight portions of the siding from the main track in a manner and for a purpose well known to those skilled in the art.

Each block is provided with a track circuit a track battery as 8 being located at one end of each block and track relays as a, b, c, d, e, f and g near the other end of the block, constituting with their connections to the rails, track circuits well known to those skilled in the art. Track relays b, d, and f control two armatures as 9 and 10 and track relays a, c, e and g control three armatures as 9, 10 and 11. When there is no train in a block, the track relay for the block is energized and its armatures through their respective front contacts, control certain signals, and when there is a train in a block its track relay is deenergized and its armatures will close certain contacts for the purpose of locking switches 6 and 7 and making a record of train movements as will be described in more detail hereinafter.

Adjacent to the track are located groups of train control rails as A12 and A13, B12 and B13, C12 and C13, D12 and D13, E12 and E13, F12 and F13, G12 and G13. The letter prefix as B to train control rails 12 and 13 indicate that they are located in block B. Train control rails 12 and 13 are on the right hand side of the center line of the track, looking east, and control east bound movements into a block, and a similar group of train control rails on the opposite side of the track that is on the right hand side of the center line of the track looking west, control west bound train movements into a block. These west bound train control rails have been designated as A14 and A15, B14 and B15, C14 and C15, D14 and D15, E14 and E15, F14 and F15, G14 and G15. In each group of train control rails one is the home train control rail and located near the entrance to a new block and the other is a distant train control rail and located approximately the braking distance from the home rail. Thus train control rail 13 is the home train control rail for an east bound train movement and train control rail 14 is the home train control rail for a west bound train movement and train control rail 12 is the distant train control rail for an east bound movement and train control rail 15 is the distant train control rail for a west bound train movement.

When east bound train control rails are positively energized a clear signal is displayed on an east bound locomotive and when the train control rails are deenergized, a danger signal is displayed on an east bound locomotive. When the west bound train control rails are negatively energized a clear signal is displayed on a west bound locomotive but when these train control rails are deenergized a danger signal is displayed on a locomotive. The train control rails are positively energized, from a battery as 16 preferably located in the dispatcher's office, by a certain position of the manually operable switches 6 and 7 and they are negatively energized from a battery as 17 by certain other positions of the manually operable switches 6 and 7; but if switches 6 and 7 are in a position to display a clear signal for either an east bound or a west bound train movement, the train control rails will not be energized with the selected energy if the block ahead is occupied since the circuit from the dispatcher's office is broken through the corresponding track relay of the occupied block.

The east bound train control rails for the section of track between B and F are connected through the several armatures of the track relay of the block ahead to a line wire as 18 and the west bound train control rails for the section of track between B and F are connected through the several armatures of the track relay of the block ahead to a line wire as 19. Properly housed along the track is a polarized relay as 20, (shown in block B) one being necessary for each section of single track. When polarized relay 20 is positively energized its polarized armature as 21 will swing to the right as shown in Fig. 1 and an electrical connection is made between it and line wire 18 through contact 22. When polarized relay 20 is negatively energized, its polarized armature 21 will swing to the left opposite to that shown in Fig. 1 and will make an electrical connection in line wire 19 through contact 23.

Polarized relay 20 which controls the section between blocks B and F is positively energized through the following circuit: From positive pole of battery 16 in the dispatcher's office, bus 24, wire 25, spring contact 26, switch 6, shaft 28, wire 29, relay 30, wire 31, terminal 32, wire 33, polarized relay 20, wire 34, resistance 35, wire 36, track rail 1, and wires 37 and 38 to negative pole of battery 16. When relay 20 is positively energized its neutral armature 39 will make contact with front contact 40, and its polarized armature 21 will swing to the right and make contact with contact 22. Polarized relay 20 is negatively energized through the following circuit: From positive pole of battery 17, wires 41 and 37, track rail 1, wire 36, resistance 35, wire 34, polarized relay 20, wire 33, terminal 32, wire 31, relay 30, wire 29, shaft 28, switch 6, spring contact 27, wire 42, and bus 43 to negative pole of battery 17. With the polarized relay negatively energized, its neutral armature 39 will make contact with front contact 40 but its polarized armature 21 will swing to the left and make contact with contact 23. If switch 6 is in the open position that is making contact with neither contacts 26 or 27, polarized relay 20 will be deenergized and its neutral armature 39 will drop away from front contact 40.

When the dispatcher places switch 6 in contact with spring contact 26, east bound train control rails B12 and B13, C12 and C13, D12 and D13 and E12 and E13 are all positively energized, thus electrically conditioned to give proceed signals to an east bound train. Relay 20 is also positively energized and its polarized armature 21 makes contact with contact 22. Train control rails B12 and B13 are positively energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18 and wire 46, armature 9 of track relay c, front contact 47, wire 50, to train control rails B13 and B12 and thence the circuit is completed through a cab circuit on the locomotive, which will be more fully described hereinafter, to track rail 1 and thence through wires 37 and 38 to negative pole of battery 16. Similarly train control rails C12 and C13 are positively energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18, wire 51, armature 9 of track relay $d$, front contact 47, wire 52, to train control rails C13 and C12 and then the circuit is completed as hereinbefore described. Similarly train control rails D12 and D13 are positively energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18 and wire 46, armature 9 of track relay $c$, front contact 47, wire 50, to train control rails B13 and B12 and thence the circuit is completed through a cab circuit on the locomotive, which will be more fully described hereinafter, to track rail 1 and thence through wires 37 and 38 to negative pole of battery 16. Similarly train control rails C12 and C13 are positively energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18, wire 51, armature 9 of track relay $d$, front contact 47, wire 52, to train control rails C13 and C12 and then the circuit is completed as hereinbefore described. Similarly train control rails D12 and D13 are positively energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18, wire 53, armature 9 of track relay $e$, front contact 47, wire 54, to train control rails D13 and D12 and thence the circuit is completed as hereinbefore described. Similarly train control rails E12 and E13 are positively energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18, armature 9 of track relay $f$, front contact 47, wire 55, armature 11 of track relay $g$, front contact 49, wire 56, to train control rails E13 and E12 and thence the circuit is completed as hereinbefore described. The circuit to train control rails E12 and E13 is taken through both track relays $f$ and $g$ for a purpose which will be more fully described hereinafter.

It will thus be seen that when switch 6 is in contact with spring contact 26, the east bound train control rails are electrically conditioned to give a clear signal, but if there should be a train in the block ahead, the circuit is broken through the track relays of the occupied block and the train control rails will be deenergized, thus conditioned to give a danger signal. It will also be noted that when the east bound train control rails from block B to block F are electrically conditioned to give a proceed signal, all west bound train control rails are deenergized, thus conditioned to give a danger signal since polarized armature 21 of relay 20 is not in contact with contact 23.

When the dispatcher places switch 6 in contact with spring contact 27, west bound train control rails F14 and F15, E14 and E15, D14 and D15 and C14 and C15 are all negatively energized thus electrically conditioned to give proceed signals to a west bound train. Polarized relay 20 is now negatively energized and its polarized armature 21 makes contact with contact 23. Train control rails F14 and F15 are negatively energized through the following circuit: From negative pole of battery 17, bus 43, wire 42, spring contact 27, switch 6, shaft 28, wire 29, relay 30, wire 31, terminal 32, wire 44, armature 39, front contact 40, wire 45, polarized armature 21, contact 23, line wire 19, armature 10 of track relay $e$, front contact 48, wire 57, to train control rails F14 and F15 and thence the circuit is completed through a cab circuit on the locomotive to be more fully described hereinafter to track rail 1 and thence through wires 37 and 41 to the positive pole of battery 17. The above circuit for convenience has been described against the flow of current as will also be done in describing the circuits to train control rails E14 and E15, D14 and D15 and C14 and C15. Similarly train control rails E14 and E15 are negatively energized through the following circuit: From negative pole of battery 17, bus 43, wire 42, spring contact 27, switch 6, shaft 28, wire 29, relay 30, wire 31, terminal 32, wire 44, armature 39, front contact 40, wire 45, polarized armature 21, contact 23, line wire 19, wire 58, armature 10 of track relay $d$, front contact 48, and wire 59, to train control rails E14 and E15 and thence the circuit is completed as hereinbefore described. Similarly train control rails D14 and D15 are energized through the following circuit: From negative pole of battery 17, bus 43, wire 42, spring contact 27, switch 6, shaft 28, wire 29, relay 30, wire 31, terminal 32, wire 44, armature 39, front contact 40, wire 45, polarized armature 21, contact 23, line wire 19, wire 60, armature 10 of track relay $c$, front contact 48, wire 61, to train control rails D14 and D15 and thence the circuit is completed as hereinbefore described. Similarly train control rails C14 and C15 are negatively energized through the following circuit: From negative pole of battery 17, bus 43, wire 42, spring contact 27, switch 6, shaft 28, wire 29, relay 30, wire 31, terminal 32, wire 44, armature 39, front contact 40, wire 45, polarized armature 21, contact 23, line wire 19, wire 62, armature 11 of track relay $a$, front contact 49, wire 63, armature 10 of track relay $b$, front contact 48, wire 64, and thence the circuit is completed as hereinbefore described. The circuit to train control rails C14 and C15 is taken through both track relays $a$ and $b$ for a purpose to be more fully described hereinafter.

It will thus be seen that when switch 6 is in contact with spring contact 27, the west bound train control rails are electrically conditioned to give a clear signal but if there should be a train in the block ahead the circuit is broken through the track relay of the occupied block and the train control rails will be deenergized, thus conditioned to give a danger signal. It will also be noted that when the west bound train control rails from block F to block B are electrically conditioned to give a proceed signal, all east bound train control rails in the section are deenergized, thus conditioned to give a danger signal since polarized armature 21 of relay 20 is not in contact with contact 22. When switch 6 is in the vertical position so as not to make contact with either spring contact 26 or 27, polarized relay 20 is deenergized and its neutral armature will drop away from front contact 40. This results in both east and west bound train control rails between the blocks F and B being deenergized and thus conditioned to give a danger signal.

It will thus be seen that the dispatcher may condition the train control rails governing the single track section between passing sidings for an east bound train movement, for a west bound train movement, or he may condition them to display a danger signal to both east and west bound trains. In addition to the dispatcher's manual control of the electrical conditions of the train control rails, automatic control is also provided by means of a track circuit. Assuming that there is no train in any of the blocks between B and E, and the dispatcher has set up an east bound train movement by placing switch 6 in contact with spring contact 26, and a train received a clear signal at train control rail B13 and proceeds into block C, as soon as the train entered block C, the current from track battery 3 of clock C is short circuited through the wheels and axles of the train and therefore track relay c becomes sufficiently deenergized so that its armatures will drop away from the front contacts. When this occurs train control rails B12 and B13 become deenergized since the circuit is now broken by armature 9 of track relay c dropping away from front contact 47. As soon however as the train has left block C and entered block D, track relay c again becomes energized thus again closing the circuit to train control rails B12 and B13 and a second train may proceed eastward with a clear signal. It will therefore be seen that a train which proceeds over the road automatically protects itself in the rear, so that a following train will automatically receive a danger signal when it arrives within braking distance of a train ahead, occupying the block ahead. The same automatic rear end protection by means of a track circuit is also provided for west bound movements. For instance a west bound train entering block E will deenergize track relay e, thus breaking the circuit at front contact 48 of track relay e and deenergizing west bound train control rails F14 and F15. As soon however as this train has left block E, train control rails F14 and F15 are again energized thus permitting a following train to proceed with a clear signal.

The object of taking the circuit to train control rails A12 and A13 through both track relays b and c and the circuit to train control rails E12 and E13 through both track relays f and g is as follows: If the dispatcher has placed switch 6 in contact with spring contact 26 thus setting up an east bound movement of a train from blocks B to E, and also placed switch 7 in contact with spring contact 27, thus setting up a west bound train movement for a train running in the single track section east of block G, the two trains will have to meet and pass each other at the siding in block F. If now the east bound train enters block E approximately at the same time that the west bound train enters block G, each train will automatically receive a danger signal, by reason of the track circuit control, before reaching block F and this will give the trains ample distance to slow down or stop until one of the trains has taken the siding. This arrangement is desirable if block F and the siding are relatively short. While this arrangement shows the preferred form, it is not absolutely necessary, particularly if block F and its siding are relatively long. The arrangement of taking the circuit to the train control rails through two track relays can also be obviated by placing the distant train control rails F12 and F15 a sufficient distance back to give the engineer ample warning to stop for the meet.

Switch 7 controls the single track section east of block F through polarized relay 21a in the identical manner as described for the section from B to F and where the dispatcher controls the train movements over a large number of single track sections from one central point, duplicate control switches as 6 and 7 with their corresponding circuits are provided for each section.

The system is so arranged that when the dispatcher has set up an east bound movement from block B to block F by placing switch 6 in contact with spring contact 26, as soon as the train enters block C after receiving a clear signal at train control rail B13, switch 6 is automatically locked in the position it is in so that it cannot be moved by the dispatcher and the switch remains locked until after the train has passed out of block E. This is accomplished in the following manner: Switches 6 and 7 are rotatable on shaft 28. Secured to this shaft is a disk as 65. In the periphery of this disk are two notches as 66 and 67. The armature 68 of relay 30 is hinged at 69. At the other end of armature 68 is a detent as 70 so positioned that when switch 6 is in contact with spring contact 26, detent 70 will be in alignment with notch 66 and when switch 6 is in contact with spring contact 27 detent 70 is in alignment with notch 67. When relay 30 is energized it will attract its armature 68 and if detent 70 is in alignment with either notch 66 or 67, it will engage one of the notches, thus preventing the switch from being turned from the position it is in as long as the relay 30 is energized. When relay 30 is not energized a spring as 71 pulls detent 70 out of engagement with the notches in disk 65.

When switch 6 is in contact with spring contact 26 and there is a train in blocks C, D, or E relay 30 is energized and thus the switch is locked as long as the train remains in the blocks C, D, or E. When block C is occupied by an east bound train, relay 30 is energized through the following circuit: From positive pole of battery 16, bus 24, wire 25, spring contact 26, switch 6, shaft 28, wire 29, relay 30, wire 31, terminal 32, wire 44, armature 39 of relay 20, front contact 40, wire 45, polarized armature 21, contact 22, line wire 18, wire 46, armature 9 of track relay c, back contact 72, wire 73, track rail 1, and wires 37 and 38, to the negative pole of battery 16. When block D is occupied relay 30 is energized through the following circuit: From positive pole of battery 16, bus 24, wire 25, spring contact 26, switch 6, shaft 28 and wire 29, relay 30, wire 31, terminal 32, wire 44, armature 39, front contact 40, wire 45, polarized armature 21, contact 22, line wire 18, wire 51, armature 9 of track relay d, back contact 72, wire 74, track rail 1, and wires 37 and 38 to negative pole of battery 16. When block E is occupied, relay 30 is energized through the following circuit: From positive pole of battery 16, bus 24, wire 25, spring contact 26, switch 6, shaft 28, wire 29, relay 30, wire 31, terminal 32, wire 44, armature 39, front contact 40, wire 45, polarized armature 21, contact 22, line wire 18, wire 53, armature 9 of track relay e, back contact 72, wire 75, track rail 1, and wires 37 and 38 to the negative pole of 16. It will thus be seen that as long as an east bound train occupies either blocks C, D, or E detent 70 engages notch 66 thus locking switch 6 in the position it is in.

When switch 6 is in contact with spring contact 27 in the proper position for a west bound movement from block F to block B, relay 30 is energized as long as a west bound train is in blocks E, D, or C. When block E is occupied relay 30 is energized through the following circuit: From positive pole of battery 17, wires 41 and 37, track rail 1, wire 75, back contact 76, armature 10 of track relay e, line wire 19, contact 23, polarized armature 21, wire 45, front contact 40, armature 39, wire 44, terminal 32, wire 31, relay 30, wire 29, shaft 28, switch 6, spring contact 27, wire 42, and bus 43, to negative pole of battery 17. Similarly when block D is occupied, relay 20 is energized through the following circuit: From positive pole of battery 17, wires 41 and 37, track rail 1, wire 74, back contact 76, armature 10 of track relay d, wire 58, line wire 19, contact 23, polarized armature 21, wire 45, front contact 40, armature 49, wire 44, terminal 32, wire 31, relay 30, wire 29, shaft 28, switch 6, spring contact 27, wire 42, and bus 43 to negative pole of battery 17. When block C is occupied relay 30 is energized through the following circuit: From positive pole of battery 17, wires 41 and 37, track rail 1, wire 73, back contact 76, armature 10 of track relay c, wire 60, line 19, contact 23, polarized armature 21, wire 45, front contact 40, armature 39, wire 44, terminal 32, wire 31, relay 30, wire 29, shaft 28, switch 6, spring contact 27, wire 42, and bus 43, to negative pole of battery 17.

It will thus be seen that when the dispatcher has set up a west bound movement from block B to block E and a train has accepted a clear or proceed signal and has entered block C, the dispatcher is unable to change the position of switch 6 until the train has left block E and when the dispatcher has set up a west bound movement from block F to block C and a train has accepted a clear or proceed signal and has entered block E, the dispatcher is unable to change the position of switch 6 until the train has left block C. In other words the dispatcher is unable to give a proceed signal to both an east bound train and a west bound train at the same time between two points where trains may pass each other.

It will be noted that track relays b and f have not been provided with a back contact. This back contact has been omitted in the preferred form so that switches 6 and 7 will be unlocked as soon as a train has left the single track section of the railroad and has entered a siding block such as B or F. It is desirable in the preferred form to give the dispatcher full liberty in placing switches in the positions desired as soon as the train has reached the main track or the sidings of block B or F.

I will now describe the apparatus and circuits on the locomotive or car capable or displaying a clear signal to an east bound train when passing an east bound train control rail which is energized with positive direct current, and displaying a clear signal to a west bound train when passing a west bound train control rail which is energized with negative direct current, and displaying a danger signal to both an east or west bound train when passing a train control rail which is deenergized, and also how these signals are continued after the locomotive has passed the train control rail.

In Fig. 2 is shown a device shown as a signal which is designated as No. 1, representing the clear signal and a device shown as a signal which is designated as No. 2, representing the danger signal. While these devices are represented as lamps and designated signals, they may equally as well represent an electromagnetic device to which motion is given depending upon whether the circuit is energized or deenergized and such electromagnetic devices may be used for other purposes than, or in addition to, the display of signals to the engineer such as is well known in the art, the proper control of speed control devices or electro-pneumatic air valves or both.

In Fig. 2, is shown an electric contact shoe as 77 so positioned on the locomotive as to make contact with train control rails. The contact shoe is hinged at 78. The train control rails are inclined at the ends so as to form a ramp in the usual manner, such as is shown in my prior Patent No. 1,140,623, granted May 25, 1915. When the contact shoe slides along this ramp, the shoe is tilted so as to break contact at 79. When the contact shoe leaves the other end of the train control rail a spring as 80 forces the contact shoe to the normal position thus again closing contact 79.

The locomotive also carries a polarized relay as 81 and a battery as 82. Polarized relay 81 controls neutral armature 83 and two polarized armatures 84 and 85. When polarized relay 81 is energized its neutral armature will make contact with front contacts 86 and 87 and when the relay is deenergized neutral armature 83 will make contact with back contact 88. The polarized armatures 84 and 85 are two members of a pole changing switch for the purpose of changing the polarity of the flow of current from battery 82. When polarized relay 81 is positively energized, polarized armatures 84 and 85 assume the positions as shown in Fig. 2, and contact with contacts 89 and 90 and when polarized relay 81 is negatively energized polarized armatures 84 and 85 will assume the position opposite to that shown in Fig. 2 and make contact with contacts 91 and 92. It will be understood that the polarized armatures 84 and 85 of relay 81 are of the "stick" type, i. e., that after being moved to one polar position, they will remain in that position, even though the relay becomes deenergized, until the relay is energized with current of opposite polarity, causing them to assume the opposite polar position.

When the contact shoe 77 is passing an east bound train control rail, such as, for instance B13 and the train control is energized with positive direct current, polarized relay 81 on the locomotive is positively energized from battery 16 in the dispatcher's office through the following circuit: From positive pole of battery 16, bus 24, wire 25, spring contact 26, switch 6, shaft 28, wire 29, relay 30, wire 31, terminal 32, wire 44, armature 39, front contact 40, wire 45, polarized armature 21, contact 22, line wire 18, wire 46, armature 9 of track relay c, front contact 47, wire 50, train control rail B13, contact shoe 77, wire 93, polarized relay 81, wires 94, 95, 96 and 97, resistance 98, wire 99, axle 100, wheel 101, track rail 1, and wires 37 and 38 to negative pole of battery 16. With relay 81 positively energized neutral armature 83, will make contact with front contact 86 and 87 and polarized armatures 84 and 85 will make contact with 89 and 90 and a circuit is established through signal No. 1, the clear signal as follows:—From positive pole of battery 82, wires 102 and 103, contact 89, polarized armature 84, wire 104, armature 83, front contact 86, wire 105, signal No. 1, wires 106, 95 and 107, polarized armature 85, contact 90, and wire 108 to the negative pole of battery 82. When the contact shoe 77 leaves the other end of train control rail, contact 79 is again closed and a stick circuit is established through relay 81 as follows: From positive pole of battery 82, wire 102 and 103, contact 89, polarized armature 84, wire 104, armature 83, front contact 87, wire 109, contact 79, contact shoe 77, wire 93, polarized relay 81, wires 94, 95 and 107, polarized armature 85, contact 90, and wire 108 to the negative pole of battery 82. Thus polarized relay 81 continues to be positively energized and signal No. 1, the clear signal is continued after contact shoe 77 has left the train control rail.

Assuming now that train control rail B13 is deenergized by reason of the switch 6 being in contact with contact spring 27, or by reason of switch 6 being open, or by reason of there being a train in block C, then when the east bound train passes the train control rail B13, the stick circuit hereinbefore described is broken at contact 79 and polarized relay 81 will be deenergized. Under these conditions a circuit is established through signal No. 2, the danger signal as follows: From positive pole of battery 82, wires 102 and 103, contact 89, polarized armature 84, wire 104, armature 83, back contact 88, wire 110, signal No. 2, and wires 111, 96 and 107, polarized armature 85, contact 90, wire 108 to the negative pole of battery 82. If the train under these conditions proceeds and contact shoe 77 leaves the other end of the train control rail, contact 79 is again closed but the stick circuit is now open at front contact 87, and signal No. 2 is continued until an energized train control rail is reached.

Assuming now that the single track section from F to C is set up for a west bound train movement by reason of switch 6 being in contact with spring contact 27, then all of the west bound train control rails between block F and block B will be energized with negative direct current. When the west bound train is passing train control rail, say F14, relay 81 on the locomotive will be negatively energized through the following circuit: From positive pole of battery 17, wires 41 and 37, track rail 1, wheel 101, axle 100, wire 99, resistance 98, wires 97, 96, 95 and 94, polarized relay 81, wire 93, contact shoe 77, train control rail F14, wire 57, front contact 48, armature 10, of track relay e, line wire 19, contact 23, polarized armature 21, wire 45, contact 40, armature 39, wire 44, terminal 32, wire 31, relay 30, wire 29, shaft 28, switch 6, contact 27, wire 42, and bus 43, to negative pole of battery 17. With polarized relay 81 negatively energized its polarized armatures will make contact with contacts 91 and 92 and a circuit is established through signal No. 1 as follows: From positive pole of battery 82, wires 102, and 112, contact 92, polarized armature 85, wires 107, 95 and 106, signal No. 1, wire 105, front contact 86, armature 83, wire 104, polarized armature 84, contact 91, wire 108 to the negative pole of battery 82. When the contact shoe 77 leaves the other end of the train control rail, contact 79 is again closed and a stick circuit is established, through polarized relay 81, as follows: From positive pole of battery 82, wires 102 and 112, contact 92, polarized armature 85, wires 107, 95 and 94, polarized relay 81, wire 93, contact shoe 77, contact 79, wire 109, front contact 87, armature 83, wire 104, polarized armature 84, contact 91 and wire 108 to negative pole of battery 82. Thus polarized relay 81 continues to be negatively energized and signal No. 1 is continued after contact shoe 77 has left the train control rail.

Assuming now that train control rail F14 is deenergized by reason of switch 6 being in contact with contact spring 26, or by reason of switch 6 being open or by reason of there being a train in block E, then when a west bound train passes train control rail F14, the stick circuit hereinbefore described is broken at contact 79 and polarized relay 81 will be deenergized. Under these conditions a circuit is established through signal No. 2 as follows: From positive pole of battery 82, wires 102 and 112, contact 92, polarized armature 85, wires 107, 96 and 111, signal No. 2, wire 110, back contact 88, armature 83, wire 104, polarized armature 84, contact 91, and wire 108 to the negative pole of battery 82. If the train under these conditions proceeds and contact shoe 77 leaves the other end of train control rail, contact 79 is again closed but the stick circuit is now open at front contact 87, and signal No. 2 is continued until an energized train control rail is reached.

It is evident that when switch 6 is in contact with spring contact 26, the normal position for an east bound train movement, all east bound train control rails in the section are positively energized by reason of polarized armature 21, of relay 20, making contact with contact 22, and an eastbound locomotive passing any other train control rail in the section will receive a clear signal through the several circuits hereinbefore described, provided there is no train in the block ahead in which case the train control rail governing the entrance to the occupied block would be deenergized and a danger signal would be displayed. Likewise when switch 6 is in contact with spring contact 27, normal for a west bound movement from block F to block C all west bound train control rails in the section are negatively energized, by reason of polarized armature 21 of relay 20 making contact with contact 23 and a westbound locomotive passing any other train control rail in the section will receive a clear signal through the several circuits hereinbefore described provided there is no train in the block ahead in which case the train control rails governing the entrance to the occupied block would be deenergized and a danger signal would be displayed.

Resistance 98 is inserted in the cab circuit for the following purpose: When there is a train in blocks C, D or E current is flowing through relay 30 in the dispatcher's office thus locking switch 6 in the position it is in as hereinbefore described. When contact shoe 77 on the locomotive is passing an energized train control rail, current is also flowing through relay 30 but by reason of the combined resistance of relay 81 and resistance 98 there is not sufficient current flowing through relay 30 to attract its armature 68 against the tension of spring 71, therefore a train passing a train control rail will not lock switch 6. For instance it is desirable when there is a train in block B, that the switches governing the adjacent sections of single track be unlocked and it is possible that a contact shoe on the locomotive may be in contact with either train control rails B12, B13, B14, or B15 and this would lock the switches if the current flow through relay 30 is not reduced as arranged by the introduction of the necessary resistance in the cab circuit.

It may also be noted that the relay 20 governing the flow of current to the several ramp rails is energized by means of a circuit flowing from battery 16 or battery 17 through switch 6, wire 29, relay 30, wire 31, wire 33, relay 20, wire 34, resistance 35, rail 1, and wire 37 back to the battery. When this circuit is established, the current flowing through relay 30 is not strong enough, by reason of the insertion of the resistance 35, to attract and hold the armature 68 against the strength of the spring 71. When, however, a train is in blocks C, D, or E, with armature 21 of relay 20 contacting with either points 22 or 23, the current passing through armature 39 is returned by wires 73, 74, or 75 to rail 1. These wires do not contain resistances such as resistance 35, and hence, with this condition, enough current flows through relay 30 to attract and hold armature 68, thus locking the switch 6.

With respect to this locking feature, it may be noted that the switch is automatically locked by the presence of a train in the section until the train either enters the last block of the section or takes the siding, when the lock is automatically released. This system prevents the dispatcher from setting up adverse signals so long as any mid-portion of a section is occupied, but permits him to route the trains at will when they are in or about to be in a position to pass.

I will now describe the means by which a record is made in the dispatcher's office of the movement of trains. In the dispatcher's office is a suitably mounted record sheet as 113, driven by a roller as 114 which in turn is driven by a shaft as 115. Shaft 115 receives motion through ratchet wheel 116. A pawl as 117 is pivotally attached to armature as 118 of electromagnet as 119, the armature being hinged at 120. When electromagnet 119 is periodically energized, motion is given to ratchet wheel 116 by pawl 117. A spring 121 normally pulls armature 118 and pawl 117 to the right, when electromagnet 119 is not energized. Electromagnet 119 is connected by wire 122 to a make and break device as 123, which make and break device is periodically operated by a clock as 124. This may well be of the form as shown in my prior Patent 1,203,146 granted October 21, 1916. When the make and break device is closed, electromagnet 119 is energized through the following circuit: From battery 125, wires 126 and 127, electromagnet 119, wire 122, make and break device 123, wires 128, and 129, to other side of battery 125. The make and break device 123 is operated say every five seconds, so as to give a slow and uniform movement to record sheet 113 through ratchet wheel 116 and pawl 117.

The record sheet 113 is transversely divided into sections as 130, 131, each section representing a section of single track between passing sidings or other points where trains may pass each other. The record sheet is longitudinally divided into time lines such as 1 A. M. each one of the lines representing a one minute interval. It will thus be seen that longitudinally the record sheet assumes a constantly changing position during the 24 hours of the day.

Adjacent to the record sheet are located perforating magnets at 132 and 133, two for each section of single track. These perforating magnets control armatures 134. Pivotally attached to armatures 134 are perforating needles as 135 so positioned adjacent to the record sheet that when a perforating magnet is energized, a perforation is made in the record sheet.

Perforating magnet 132 records east bound train movements through blocks C, D, and E and perforating magnet 133 records west bound train movements through block E, D, and C. As hereinbefore described when blocks C, D, or E are occupied by either an east bound or a west bound train, relay 30 is energized and its armature 68 is in the energized position. When blocks C, D, or E are occupied, relay 30 is energized by current passing through the locking circuit wires 73, 74, or 75. Attached to armature 68 but insulated therefrom is a metallic contact plate as 136 and when armature 68 is in the energized position, this contacts with contacts 137 and 138, thus closing the circuit through the perforating magnets at this point. Also attached to switch 6 are metallic wedges as 139 and 140 but insulated therefrom. When switch 6 is set up for an east bound train movement, thus making contact with spring contact 26, metallic wedge 139 makes electrical contact with spring contacts 141 and 142, thus closing the circuit through perforating magnet 132 at this point. The circuit through perforating magnet 132 is as follows: From battery 125, wires 126 and 143, contact 144, metallic plate 145, contact 146, bus 147, wire 148, perforating magnet 132, wire 149, spring contact 141, metallic wedge 139, spring contact 142, wire 150, contact 137, metallic plate 136, contact 138, wire 151, and wire 129 to the other side of battery 125. When switch 6 is set up for a west bound movement, thus making contact with spring contact 27, metallic wedge 140 makes electrical contact with spring contacts 152 and 153, thus closing the circuit through perforating magnet 133 as follows: From battery 125, wires 126 and 143, contact 144, metallic plate 145, contact 146, bus 147, wire 154, perforating magnet 133, wire 155, spring contact 152, metallic wedge 140, spring contact 153, wire 156, wire 150, contact 137, metallic plate 136, contact 138, and wires 151 and 129 to the other side of battery 125.

It will be noted that the circuits through perforating magnets are taken through a circuit breaking device as 145 so that these circuits are periodically made and broken. This circuit breaking device operates as follows: Metallic contact plate 145 is attached to armature 118 but insulated therefrom. Every time electromagnet 119 is energized which as hereinbefore stated, say every five seconds, the contacts 144 and 146 are closed through metallic plate 145. When magnet 119 is deenergized armature 118 is pulled to the right by spring 121 and the circuit through the perforating magnet is broken. By reason of this periodic breaking of the circuit, a continuous perforation is made on the record sheet, as long as a section of single track consisting of blocks C, D, and E is occupied by a train. Thus when an east bound train leaves block B, perforating magnet 132 will start to perforate in section 131 of the record sheet as soon as the train has entered block C and will continue to perforate until the train has left block E, thus recording the exact time when the train entered the single track section and also the time the train remained in the single track section. Similarly a west bound train will record its movement through perforating magnet 133.

A dispatcher having a number of single track sections under his control thus knows what progress the trains under his supervision are making and can direct the train movements by properly positioning the manually operable switches with the greatest dispatch. For instance by reason of the accurate knowledge of the location of trains on his division, he decides that block F is the most suitable place for an east bound train to pass a west bound train. Under these conditions switch 6 will be placed in the east bound position making contact with spring contact 26. This will permit the east bound train to proceed with a clear signal up to the distant train control rail F12 at which point the clear signal will change to danger. Switch 7 will be placed in the west bound position making contact with spring contact 27 and the west bound train will proceed with a clear signal until distant train control rail F15 is reached, at which point the danger signal will be shown. If the west bound train had arrived in either blocks G or F before the east bound train had reached train control rail E12, then the east bound train would receive a danger signal at train control rail E12 by reason of the track circuit control of blocks G and F and if the east bound train had arrived at either blocks E or F before the west bound train had reached train control rail G15, the west bound train would get a danger signal at train control rail G15 by reason of the track circuit control of blocks F or E. When an east bound train is traveling from block B to F, perforating magnet 132 in the section 131 of the record sheet will continue to perforate but this perforation will automatically cease as soon as the east bound train has left block E and entered block F or the siding at F. Thus the dispatcher will be fully advised of the arrival of the east bound train at F. Similarly the west bound train traveling toward block F will make a record of its progress through perforating magnet 133 of the section 130 of the record sheet and perforating magnet 133 will continue to perforate until the train has left block G and entered block F. As soon however as the west bound train has cleared block G perforating magnet 133 of section 130 will cease to perforate and thus the dispatcher is advised that the west bound train has arrived at F. With this knowledge the dispatcher can intelligently change the position of switches so as to facilitate the movement of trains with the greatest dispatch.

The modification shown in Fig. 3, is identical to Fig. 1, in so far as the circuits and recording means are concerned and the difference consists in substituting fixed signals in place of the train control rails necessary for cab signals. The several blocks, track batteries and track relays and track relay armatures are identical to Fig. 1, as are also the circuits from batteries 16 and 17 in the dispatcher's office through the several positions of switches 6 and 7. The circuits from polarized armature 21 of relay 20 to the train control rails are also identical except that for the train control rails, relays 157 and 158 are substituted. Relays 157 when energized will display a clear signal for an east bound train movement and when deenergized, will display a danger signal for an east bound train. Relays 158 when energized will display a clear signal for west bound train movements and when deenergized, a danger signal. These relays may control both home and distant fixed signals in the manner well known to those skilled in the art, or may be considered the signals themselves.

I will now trace the circuits through the relay 157 which controls the east bound signal into block D. When the dispatcher has placed switch 6 in contact with spring contact 26, thus authorizing an east bound train movement from block D to block F, relay 20 is positively energized and its polarized armature 21 will make contact with contact 22. This establishes a circuit to relay 157 controlling the signals into block D as follows: From battery 16 in the dispatcher's office, bus 24, wire 25, spring contact 26, switch 6, shaft 28, wire 29, relay 30, wire 31, terminal 32, wire 44, armature 39, front contact 40, wire 45, armature 21, contact 22, line wire 18, wire 51, armature 9 of track relay d, front contact 47, wire 52, resistance 159, relay 157, wire 160, track rail 1, and wires 37 and 38 to negative pole of battery 16. With current flowing in this circuit relay 157 is energized thus displaying a clear signal for an east bound movement into block D. If however there is a train in block D, track relay d becomes deenergized and its armature 9 will break away from front contact 47 resulting in relay 157 being deenergized and thus displaying a danger signal.

When the dispatcher places switch 6 in contact with terminal 27, thus authorizing a west bound train movement from block F to block B, relay 20 is negatively energized and its polarized armature 21 will make contact with contact 23. This establishes a circuit through relay 158 controlling the west bound signal into block C as follows: From positive pole of battery 17 in the dispatcher's office, wires 41 and 37, track rail 1, wire 161, relay 158, wire 162, resistance 163, wire 61, front contact 48, armature 10 of track relay c, wire 60, line wire 19, contact 23, polarized armature 21, wire 45, front contact 40, armature 39, wire 44, terminal 32, wire 31, relay 30, wire 29, shaft 28, switch 6, spring contact 27, wire 42, and bus 43 to negative pole of battery 17. With current flowing in this circuit, relay 158 is energized thus displaying a clear signal for a west bound movement into block C. If however, there is a train in block C, track relay c, becomes deenergized and its armature 9 will break away from front contact 48 resulting in relay 158 being deenergized thus displaying a danger signal. Since it is obvious that relays 157 and 158 for other blocks operate in the same manner, it is thought not necessary to describe the operation in further detail. Resistances 159 and 163 are inserted in the circuit in which they are inserted for the same purpose as resistance 98 is inserted in the cab circuit, that is to reduce the flow of current to relay 30 in the dispatcher's office so that its armature 68 is not attracted to lock switch 6 unless an armature of a track relay closes a back contact 76, in which case a shunt circuit is established which cuts out resistances 159 or 163, thereby increasing the flow of current so as to attract armature 68 of relay 30 and lock the switch in the position it is in.

The purpose of the invention is to provide a simpler and inexpensive system of signalling for a railway where a track is used for both directions of traffic. It is particularly adaptable to single track uses but it is equally adapted for two or more track lines where it is desirable to use a certain track normally for one direction but at times to operate trains with dispatch and safety in the opposite direction.

Although I have particularly described one of the physical embodiments of my invention and illustrated the same, nevertheless I desire to have it understood that the particular form illustrated is merely illustrative and does not exhaust the possible physical embodiments of means underlying the principle of my invention.

Having fully described my invention, I claim:

1. In a railway train control system, in combination, a central station, means at said station for supplying electrical currents which are varied from one another, a trackway divided into a plurality of sections, each of said sections comprising a plurality of consecutive blocks, a dispatcher's switch at said central station for each section for the regulation of traffic in said section, said switch being co-operative with said current supply means to select one current or another according to the direction of traffic for which the section is to be conditioned, train control means associated with each of said plurality of blocks of each section for one direction of traffic in said section, train control means associated with each of said plurality of blocks of each section for the opposite direction of traffic in said section, an electrical receiving means associated with each section and characteristically responsive to a particular current as selected by said switch, said electrical receiving means of one section controlling the train control means of each of the plurality of blocks in said section, a single wire constituting a circuit connection between said switch and said electrical receiving means, circuit connections between said electrical receiving means and the respective train control means of each of the plurality of blocks of said section, said receiving means automatically selecting one of said last named circuit connections in accordance with the particular current for which said switch is set, and return connections from said train control means to said means of current supply.

2. In a railway train control system, in combination, a central station, means at said station for supplying positive direct or negative direct current, a trackway divided into sections, each section comprising a plurality of consecutive blocks, a dispatcher's switch at said central station for the regulation of traffic in one section, said switch being cooperative with said current supply means to select one current or the other according to the direction of traffic for which the section is to be conditioned, train control means associated with each of said plurality of blocks of said section for one direction of traffic in said section, train control means associated with each of said plurality of blocks of said section for the opposite direction of traffic in said section, polarized relay means associated with said section, a single wire constituting a circuit connection between said switch and said relay means, circuit means connecting said relay means and the train control means of said plurality of blocks of said section for one direction of traffic, circuit means connecting said relay means and the train control means of said plurality of blocks of said section for the other direction of traffic, said relay means automatically selecting one of said circuit means in accordance with the particular current for which said switch is set, and return connections from said train control means to said means of current supply.

3. In a railway train control system, in combination, a central station, means at said station for supplying electrical currents which are varied from one another, a trackway section, said being divided into blocks, a dispatcher's switch at said central station for the regulation of traffic in said section, said switch being co-operative with said current supply means to select one current or another according to the direction of traffic for which the section is to be conditioned, train control means associated with each block of said section for one direction of traffic in said section, train control means associated with each block of said section from the opposite direction of traffic in said section, an electrical receiving means associated with said section and characteristically responsive to a particular current as selected by said switch, a single wire constituting a circuit connection between said switch and said electrical receiving means, circuit connections between said electrical receiving means and the respective train control means of said section, said receiving means automatically selecting one of said last named circuit connections in accordance with the particular current for which said switch is set, return connections from said train control means to said means of current supply, a locking device for holding said switch in either of its operative positions, and circuits for the operation of said device controlled by said receiving means.

4. In a railway train control system, in combination, a central station, means at said station for supplying electrical currents which are varied from one another, a trackway divided into a plurality of sections, one of said sections being divided into a plurality of consecutive blocks, a dispatcher's switch at said central station for the regulation of traffic in said section and being co-operative with said current supply means to select one current or another according to the direction of traffic for which the section is to be conditioned, a vehicle on said section, electrical energy transmitting means associated with each of the plurality of blocks of said section for co-operation with said vehicle in effecting a clear signal for one direction of traffic, other electrical energy transmitting means associated with each of the plurality of blocks of said section for co-operation with said vehicle in effecting a clear signal for the opposite direction of traffic, an electrical receiving means associated with said section and characteristically responsive to a particular current as selected by said switch, said electrical receiving means controlling the train control means of said plurality of blocks in said section, a single wire constituting a circuit connection between said switch and said electrical receiving means, circuit connections between said electrical receiving means and the respective electrical energy transmitting means of said plurality of blocks of said section, said receiving means automatically selecting one of said last named circuit connections in accordance with the particular current for which said switch is set, and return connections from said train control means to said means of current supply.

5. In a railway train control system, in combination, a central station, means at said station for supplying electrical currents which are varied from one another, a trackway section, said section being divided into blocks, a dispatcher's switch at said central station for the regulation of traffic in said section, said switch being co-operative with said current supply means to select one current or another according to the direction of traffic for which the section is to be conditioned, train control means associated with each block of said section for one direction of traffic in said section, train control means associated with each block of said section for the opposite direction of traffic in said section, an electrical receiving means associated with said section and characteristically responsive to a particular current as selected by said switch, a single wire constituting a circuit connection between said switch, and said electrical receiving means, circuit connections between said electrical receiving means and the respective train control means of the blocks in said section, said receiving means automatically selecting one of said last named circuit connections in accordance with the particular current for which said switch is set, return connections from said train control means to said means of current supply, means at the central station for indicating the movements of a vehicle in one direction along said section, means at the central station for indicating the movements of a vehicle in the opposite direction along said section, operating circuits for the respective means controlled by said dispatcher's switch in accordance with its position, a closer for said circuits, and means controlled by said electrical receiving means for operating said closer.

6. In a railway train control system, in combination, a central station, means at said station for supplying electrical currents which are varied from one another, a trackway section, said section being divided into blocks, a dispatcher's switch at said central station for the regulation of traffic in said section, said switch being co-operative with said current supply means to select one current or another according to the direction of traffic for which the section is to be conditioned, train control means associated with each block of said section for one direction of traffic in said section, train control means associated with each block of said section for the opposite direction of traffic in said section, an electrical receiving means associated with said section and characteristically responsive to a particular current as selected by said switch, a single wire constituting a circuit connection between said switch and said electrical receiving means, circuit connections between said electrical receiving means and the respective train control means of said section, said receiving means automatically selecting one of said last named circuit connections in accordance with the particular current for which said switch is set, return connections from said train control means to said means of current supply, means at the central station co-operative with said dispatcher's switch for indicating the movements of vehicles in said section, and means controlled by said electrical receiving means for causing the operation of said indicating means.

7. In an automatic train control, in combination, a trackway, means dividing the trackway into electrically isolated sections, sidings at intervals, a polarized relay positioned at each siding, a central station, a vehicle, vehicle control means on the vehicle, means located at the central station manually operable for characteristically energizing the polarized relay at a siding and means governed by the said relay for controlling the vehicle control means, and means associated with each section and controlled by the manually operable means and the polarized relay for recording at the central station the progress of a vehicle over the section.

8. In an automatic train control, in combination, a trackway, means dividing the trackway into electrically isolated sections, sidings at intervals, a polarized relay positioned at each siding a central station, a vehicle, vehicle control means on the vehicle, means located at the central station manually operable for characteristically energizing the polarized relay at a siding and means governed by the said relay for controlling the vehicle control means, and means associated with each section and controlled by the manually operable means and the polarized relay for indicating at the central station the progress of a vehicle over the section.

9. A train control and dispatching system comprising a trackway divided into sections, each section being divided into blocks, a track circuit for each block for providing rear end protection for trains following in the section, signalling means for each section for each direction of train movement, a central office for controlling the movements of trains throughout a number of sections, currents of different kinds at the central office, a main circuit leading from the central office to a section, a switch at the central office for selectively supplying one of said currents to said circuit, a section control relay governed by said central office current in said main circuit and being characteristically conditioned by the selection of current at the central office, line circuits controlled by said section relay for establishing proceed or stop signal aspects in the signalling means for the section for one direction of train movement and stop or proceed aspects for the signalling means for the opposite direction of train movement in accordance with the selection of current made at the central office, said line circuits for the respective signals being subject to track circuit control, means including said track circuits effective when a train is moving in one direction through the section for preventing the conditioning of the signalling means for the opposite direction to indicate proceed by manipulation of the switch at the central office, and means including said main circuit for indicating at the central office the position of a train with respect to said given section.

10. A train control and dispatching system for single track railways comprising a trackway divided into sections, each section being divided into blocks, a track circuit for each block, a central office, currents of different kinds at the central office, a switch at the central office for selecting said currents, a main circuit for supplying said selected current to a section, a section control relay characteristically responsive to the selection of current for governing the signal aspects throughout said section, train control means for each block for each direction of movement through the section, said train control means being conditioned by means of line circuits governed by said section relay in accordance with the selection of current at the central office to establish a proceed signal aspect for one direction of train movement through the section and a stop signal for the opposite direction of movement, said line circuits being subject to track circuit control, means including said track circuits for preventing a change to a proceed signal aspect at either end of the section by means of the manipulation of the switch at the central office when a train accepts a proceed signal aspect at the opposite end of the section, and means also controlled by said track circuits for indicating at the central office the movement of a train with respect to said section.

PAUL J. SIMMEN.

CERTIFICATE OF CORRECTION.

Patent No. 1,945,920.  February 6, 1934.

PAUL J. SIMMEN.

It is hereby certified that error appears in the printed specification of the above numbered patent requiring correction as follows: Page 3, line 3, beginning with the word "Similarly" strike out all to and including the word "described." in line 27; and that the said Letters Patent should be read with this correction therein that the same may conform to the record of the case in the Patent Office.

Signed and sealed this 20th day of March, A. D. 1934.

F. M. Hopkins (Seal) Acting Commissioner of Patents.